United States Patent
Tsunehara et al.

(10) Patent No.: US 6,907,260 B1
(45) Date of Patent: Jun. 14, 2005

(54) METHOD FOR CONTROLLING TRANSMIT POWER FOR COMMUNICATION SYSTEM

(75) Inventors: Katsuhiko Tsunehara, Kokubunji (JP); Takashi Yano, Kokubunji (JP); Takaki Uta, Kokubunji (JP); Toshiro Suzuki, Yokohama (JP); Toshinori Suzuki, Tokyo (JP)

(73) Assignees: KDDI Corporation, Tokyo (JP); Hitachi, Ltd., Tokyo (JP)

(*) Notice: Subject to any disclaimer, the term of this patent is extended or adjusted under 35 U.S.C. 154(b) by 0 days.

(21) Appl. No.: 09/786,459

(22) PCT Filed: Dec. 21, 1999

(86) PCT No.: PCT/JP99/07174

§ 371 (c)(1),
(2), (4) Date: Sep. 10, 2001

(87) PCT Pub. No.: WO00/38355

PCT Pub. Date: Jun. 29, 2000

(51) Int. Cl.[7] .............................. H04B 7/00; H04Q 7/20
(52) U.S. Cl. ...................... 455/522; 455/13.4; 455/69; 455/135; 370/318; 370/320; 370/332; 375/141; 375/147
(58) Field of Search ................................ 375/141, 147; 455/13.4, 68, 69, 70, 522, 134, 135; 370/318, 320, 333, 332, 325

(56) References Cited

U.S. PATENT DOCUMENTS 5,056,109 A * 10/1991 Gilhousen et al. .......... 370/342
5,995,496 A * 11/1999 Honkasalo et al. ......... 370/318
6,101,179 A * 8/2000 Soliman ..................... 370/342
6,396,867 B1 * 5/2002 Tiedemann et al. ......... 375/141
6,512,925 B1 * 1/2003 Chen et al. ................. 455/442

FOREIGN PATENT DOCUMENTS

| CN | 1198274 A | 11/1998 |
| EP | 0682418 A2 | 11/1995 |
| EP | 0847146 | 6/1998 |
| EP | 0853393 A1 | 7/1998 |
| JP | 6013956 | 1/1994 |
| JP | 10173593 | 6/1998 |
| WO | 9107037 | 5/1991 |
| WO | 9849785 | 11/1998 |

* cited by examiner

Primary Examiner—Nay Maung
Assistant Examiner—Edan Orgad
(74) Attorney, Agent, or Firm—Mattingly, Stanger, Malur & Brundidge, P.C.

(57) ABSTRACT

The present invention provides a transmit power controlling method for reducing an influence of incorrect control in a mobile communication system in the CDMA mode.

A likelihood of transmit power controlling signal is generated on the basis of the transmit power controlling signal transmitted by a radio base station and the receiving quality, a variation amount of the transmit power is generated on the basis of the likelihood, and the transmit power of a mobile station is controlled on the basis of the variation amount.

13 Claims, 16 Drawing Sheets

FIG.6
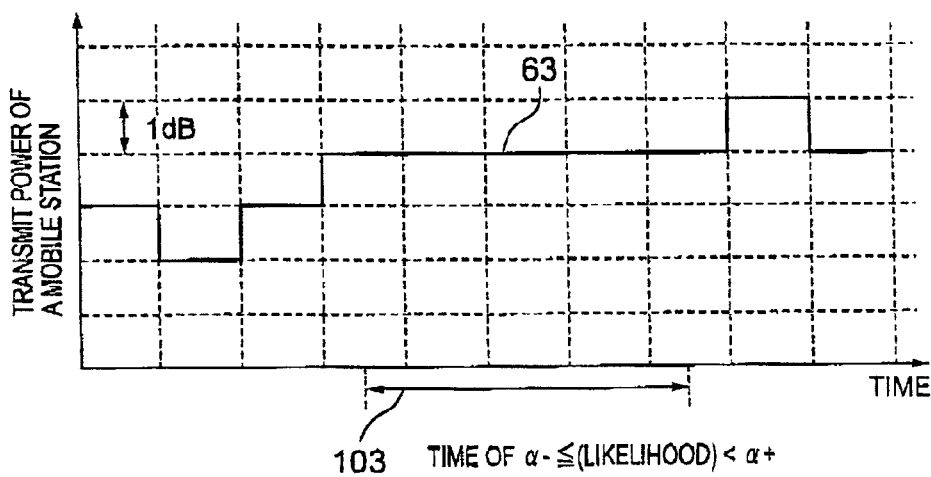
103 TIME OF α- ≤ (LIKELIHOOD) < α+
FIG.7
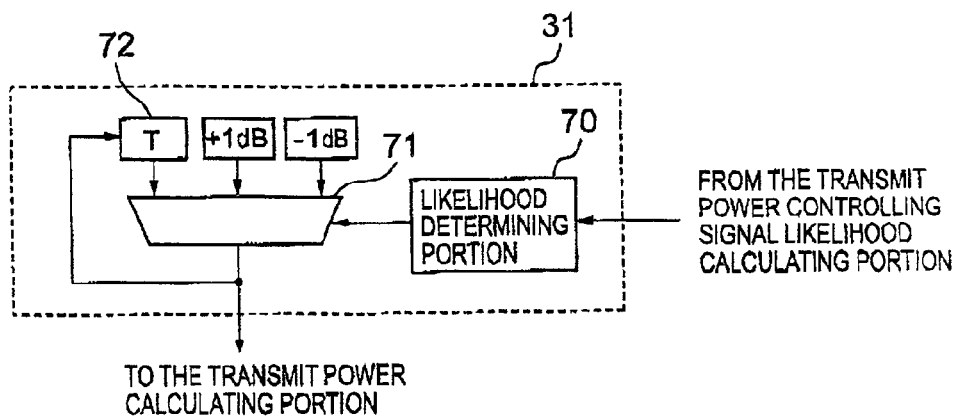
FIG.8
| INPUT | OUTPUT |
|-------|--------|
| +1dB  | -1dB   |
| -1dB  | +1dB   |

FIG.26
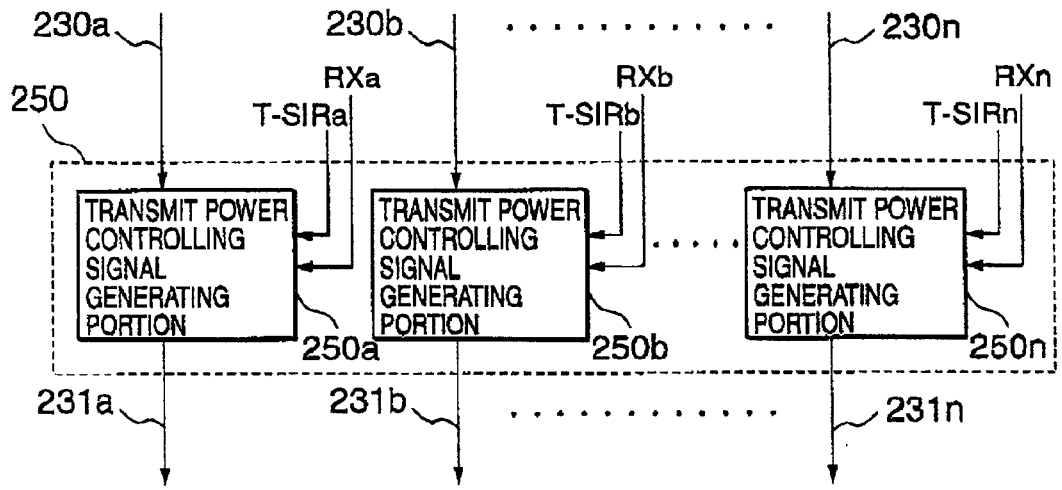
FIG.27
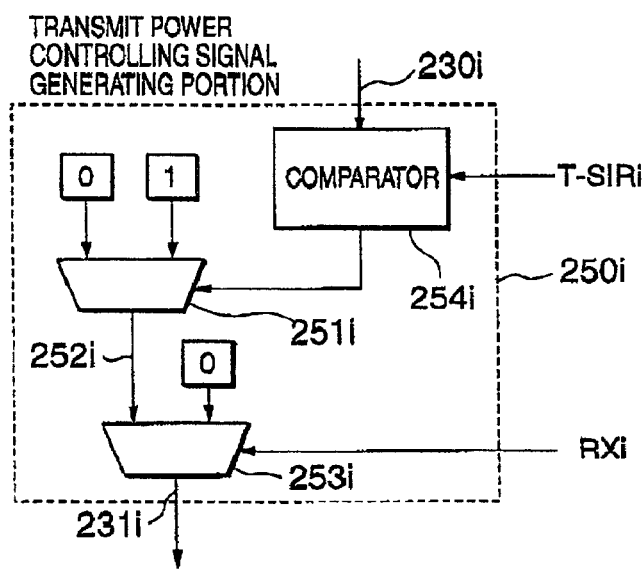
FIG.28
| RXi | OPERATION |
|---|---|
| IN A RECEIVING OPERATION | SELECTING 252i |
| IN SUSPENSION OF A RECEIVING OPERATION | SELECTING 0 |

METHOD FOR CONTROLLING TRANSMIT
POWER FOR COMMUNICATION SYSTEM

TECHNICAL FIELD

The present invention relates to a method for controlling transmit power in a mobile communication system, more particularly, a method for controlling transmit power in a mobile communication system to which a code division multiple access (CDMA) mode is applied.

BACKGROUND OF THE INVENTION

In the CDMA mode, a plurality of mobile stations share a same frequency band to communicate with a base station. Therefore, in the case of a communication between a mobile station A and a base station, for example, a signal from another mobile station B to the base station (an undesired signal) interferes a signal sent from the mobile station A to the base station (a desired signal) to obstruct a communication between the mobile station A and the base station. Similarly, the signal sent from the mobile station A obstructs a communication between the mobile station B and the base station.

The interference level increases relative to a receiving level of an undesired signal wave received by the base station. The receiving level of the undesired signal is relative to the transmit power at the time the undesired signal is sent from a mobile station. Thus, it is necessary for the base station to control the transmit power from mobile stations so that the receiving level in the base station should be always minimum essential, in order to keep the interference level minimum. Under an ideal situation of this control, the number of channels available for communication becomes the largest, while the number of channels available for a communication would decrease as the situation goes away from the ideal.

Concerning a technology in controlling transmit power in a CDMA mobile communication, provided a transmit power controlling method described in *IMT-2000 Study Committee, Air-interface WG, SWG Document Title: Volume 3 Specifications of Air-Interface for 3G Mobile System, Source: SWG, Version*: 0–4.0, Date: Dec. 18, 1997 issued by DENPA SANGYOUKAI, for example (referred to as "W-CDMA mode", hereinafter). A transmit power controlling method in the W-CDMA mode will be described below. In the description, an upstream direction means a direction of sending signals from a mobile station to a base station and a downstream direction means a direction of sending signals from a base station to a mobile station.

A base station measures a signal to interference power ratio (SIR) of a signal sent from a mobile station in the upstream direction to transmit a transmit power controlling signal in accordance with the measured SIR. A structural diagram of a conventional base station is shown in FIG. 29. A signal received by an antenna 210 passes through a circulator 211 to take a process of modulating a base band signal and a process of receiving at a high/middle frequency in a radio module for receiving 212. The base station carries out processes of synchronous capturing and reverse spreading of the received signal in synchronous capturing/reverse spreading circuits 213a to 213n in which a parameter is set for each mobile station, since the received signal is a multiplex signal from a plurality of mobile stations (referred to as MSa to MSn). The signal output from the capturing/reverse spreading circuits 213a to 213n is input to detecting potions 214a to 214n, respectively, to take a detecting process such as compensation for a phase rotation. The signal output from the detecting portions 214a to 214n is input to demodulating portions 215a to 215n, respectively, to take an error controlling process such as de-interleave and Viterbi decoding, and then, are used as received data.

On the other hand, the signal output from the capturing/reverse spreading circuits 213a to 213n is input to an upstream channel SIR measuring portion 221 through signal lines 220a to 220n, respectively. The upstream channel SIR measuring portion 221 measures SIR of the received signal input through the signal lines 220a to 220n, respectively (referred to as SIRa to SIRn), to input the SIRa to SIRn to an upstream channel transmit power controlling signal generating portion 222 through the signal lines 230a to 230n.

The upstream channel transmit power controlling signal generating portion 222 compares SIRa to SIRn with target SIRs given for MSa to MSn in advance by a controlling portion 500 (referred to as T-SIRa to T-SIRn) to generate transmit power controlling signals (TPCa to TPCn) for MSa to MSn. The controlling portion 500 is an element that controls a whole base station and that transmits various signals to each element in the base station. In FIG. 29, signal lines are omitted other than the line to the upstream channel transmit power controlling signal generating portion 222 in order to simplify the diagram. A structure of the controlling portion/the upstream channel transmit power controlling signal generating portion 222 is shown in FIG. 30. The upstream channel transmit power controlling signal generating portion 222 comprises transmit power controlling signal generating portions 222a to 222n whose inputs are SIRi and T-SIRi and whose outputs are TPCi. The added character "i" denotes one of characters "a" to "n". A structure of a transmit power controlling signal generating portion 222i is shown in FIG. 31. A comparator 223i compares SIRi and T-SIRi input through a signal line 230i to generate a signal that selects 0 in a selector 224i in the case of SIRi≧T-SIRi, and a signal that selects 1 in the selector 224i in the case of SIRi<T-SIRi. The selector 224i selects either 0 or 1 in accordance with an output from the comparator 223i to output it as TPCi through a signal line 231i. The TPCi=0 is a signal that instructs a mobile station to reduce the transmit power. On the contrary, TPCi=1 is a signal that instructs a mobile station to increase the transmit power.

Frame forming portions 225a to 225n shown in FIG. 29 form transmission data to MSa to Msn, the data which took an error controlling process such as fold-encoding and interleave in encoding portions 222a to 222n, and the transmit power controlling signals TPCa to TPCn, which are input from the upstream channel transmit power controlling signal generating portion 222, into frames in accordance with a format defined in the system. Spreading circuits 223a to 223n carry out a spectrum spreading process for outputs from the frame forming portions with a parameter corresponding to MSa to MSn. An adding circuit 226 adds transmission signals in order to multiplex signals for MSa to MSn. The transmission signals output from the adding circuit 226 are transmitted from the antenna 210 after passing through a radio module for transmission 224 and a circulator 211.

A mobile station MSi receives the aforementioned transmit power controlling signal TPCi to change the transmit power in accordance with a result of demodulation. A structure of a conventional mobile station is shown in FIG. 32. A signal received by the antenna 10 passes through a circulator 11 to take a process of demodulating a base band signal and a process of receiving at a high/middle frequency in a radio module for receiving 12.

A mobile station carries out processes of synchronous capturing and spectrum reverse spreading of the received signal in a synchronous capturing/reverse spreading circuit 13 in which a parameter is set for a channel being used in the mobile station, since the received signal is a multiplex signal in a plurality of channels. The signal output from the synchronous capturing/reverse spreading circuit 13 takes a detecting process such as compensation for a phase rotation in a detecting portion 14 and takes an error controlling process such as de-interleave and Viterbi decoding in demodulating portion 15, so as to be used as received data.

After output from the detecting portion 14, the received transmit power controlling signal passes through a signal line 16 and is input to a transmit power controlling signal determining portion 40. The transmit power controlling signal determining portion 40 determines whether the received transmit power controlling signal is "0" or "1". The transmit power controlling signal determining portion 40 generates a controlling signal, which selects "−1 dB", for example, as an output for a selector 41 when the result of determining the transmit power controlling signal is "0", and generates a controlling signal, which selects "+1 dB", for example, as an output for the selector 41 when the result of determining is "1", to send the controlling signal to the selector 41.

The selector 41 outputs either "+1 dB" or "−1 dB", for example, as a variation amount of the transmit power in accordance with a controlling signal input from the transmit power controlling signal determining portion 40.

A transmit power calculating portion 19 determines the changed transmit power, using the variation amount of the transmit power input from the selector 41 and the current transmit power input from a transmit power maintaining circuit 20. That is, the changed transmit power is increased by 1 dB from the current transmit power when the selector inputs "+1 dB", and it is decreased by 1 dB from the current transmit power when the selector contrary inputs "−1 dB".

The transmission signal takes an error controlling process such as, for example, fold-encoding and interleave, in the encoding portion 22 to form a frame of a format defined in the system in a frame forming portion 25, and then, takes a spectrum spreading process in a spreading circuit 23. A variable gain amplifier 21 amplifies transmission signals at a proper gain so that the signals could be transmitted at the designated transmit power from the transmit power calculating portion 19. The transmission signal output from the variable gain amplifier 21 passes through the radio module for transmission 24 and the circulator 11, and then, is transmitted from the antenna 10.

An example of a change of the transmit power of a mobile station in the case that the mobile station performs the above operation is shown as a solid line 62 in FIG. 33. The horizontal axis 60 shows the time, while the vertical axis 61 shows the transmit power of the mobile station. Results 83a to 83e of determining the transmit power controlling signal received at the times 120 to 124 are also shown in the horizontal axis 60. As shown in FIG. 33, the mobile station operates so as to increase the transmit power by 1 dB at the times 122 and 124 when the result of determining the controlling signal is "1" and so as to decrease the transmit power by 1 dB at the times 120, 121 and 123 when the result of determining the controlling signal is "0".

There are two problems solved by the invention as described below.

First, there is a large possibility that the received transmit power controlling signal would result in being demodulated with an error, when the quality of receiving the transmit power controlling signal in a mobile station is bad. In this case, the conventional method that the demodulated result is determined either "0" or "1" increases the possibility that the transmit power controlling signal is incorrectly determined to be a value different from the proper value.

In the case that the transmit power controlling signal, which should be determined to be "1", is incorrectly determined to be "0", namely, in the case that a mobile station incorrectly decreases the transmit power at the time when the transmit power should be increased, the quality of a signal received from the above mobile station would deteriorate in the base station. This causes the quality of a communication to be deteriorated, and furthermore, causes a communication to be cut off.

To the contrary, in the case that the transmit power controlling signal, which should be determined to be "0", is incorrectly determined to be "1", namely, in the case that a mobile station incorrectly increases the transmit power at the time when the transmit power should be decreased, the interference amount by the above mobile station to another mobile station would increase in the base station. Therefore, deterioration of the communication quality and cut-off of a communication occur in the other mobile station. This means, at the same time, that the number of mobile stations available for a communication would decrease, and as a result, the communication capacity of the whole system will be reduced.

Moreover, the aforementioned deterioration of the communication quality and reduction of the communication capacity of the system appear more significantly, when the result of determining the transmit power controlling signal, whose receiving quality is bad, is biased to either "0" or "1" due to such as a component of direct current offset contained in a receiver in a mobile station.

Secondly, when a receiving operation stops earlier than a transmitting operation as a controlling sequence in the base station upon cutting off a communication, that is, an operation of the synchronous capturing/reverse spreading circuit 213$i$ (i=1, 2, ..., n) stops earlier than that of the upstream channel SIR measuring portion 221 in FIG. 29, it is considered that the operation of the upstream channel SIR measuring portion 221 would become unstable, since the upstream channel SIR measuring portion 221 tries to get SIRi from the output of the synchronous capturing/reverse spreading circuit 213$i$ whose operation has stopped. In this case, an improper transmit power controlling signal TPCi is generated to be transmitted from the base station to the mobile station MSi. The mobile station MSi may perform transmission with an excessive transmit power, as a result of controlling the transmit power in accordance with the above-mentioned improper transmit power controlling signal TPCi. In this case, the interference amount by a signal of the mobile station MSi to another mobile station increases in the base station. Thus, the deterioration of the communication quality and cut-off of a communication occur in the other mobile station. This reduces the communication capacity of the whole system, like the first problem.

DISCLOSURE OF THE INVENTION

In order to solve the first problem, a structure according to the present invention is arranged so that a radio base station transmits a transmit power controlling signal for controlling transmit power of a mobile station, and that said mobile station calculates a likelihood of said transmit power controlling signal on the basis of the received transmit power controlling signal and the receiving quality to calculate a variation amount of the transmit power on the basis of said likelihood, so that the transmit power of the mobile station would be controlled on the basis of the variation amount.

Further, in order to solve the first problem, the invention is characterized in that said likelihood is calculated by further adding a perch receiving quality of a signal transmitted by said radio base station; that the perch receiving quality of a signal transmitted by said radio base station is compared with the receiving quality of a transmit power controlling signal so that it is determined that a call is cut off in a channel being received when only the receiving quality of the channel being received is deteriorated and it is determined that a receiving condition is no longer proper due to a mobile station being in shade or the like when the both of the receiving qualities are deteriorated at the same time; and that the likelihood is calculated on the basis of a result of the determination.

In order to solve the first problem, the invention is also characterized in that, when an absolute value of the likelihood of said transmit power controlling signal is large, an upper limit value and a lower limit value of the transmit power of a mobile station are updated and maintained so that the transmit power of said mobile station is limited between said upper limit value and said lower limit value.

In order to solve the first problem, the invention is also characterized in that an average value of the transmit power of a mobile station is calculated, and that the transmit power of said mobile station is switched on the basis of the size of said likelihood so as to be said calculated average transmit power of the mobile station or transmit power of the mobile station that is calculated on the basis of said likelihood.

In order to solve the first problem, the invention is characterized in that open loop transmit power is calculated on the basis of the receiving quality or the receiving power of another channel different from a channel being used, and that the transmit power of said mobile station is switched on the basis of the size of said likelihood so as to be said calculated open loop transmit power or transmit power of the mobile station that is calculated on the basis of said likelihood.

In order to solve the first problem, the invention is characterized in that said transmit power controlling signal is a signal comprising two values, and that said likelihood is calculated so that an absolute value of the likelihood would be large when the receiving quality is good and so that an absolute value of the likelihood would be small when the receiving quality is bad.

In order to solve the first problem, the invention is characterized in that the transmit power is increased when said likelihood is a first reference value or more, that the transmit power is maintained when said likelihood is less than said first reference value and the second reference value or more, and that the transmit power is decreased when said likelihood is less than said second reference value.

In order to solve the first problem, the invention is characterized in that the transmit power is increased when said likelihood is said first reference value or more, that the transmit power is toggle-controlled when said likelihood is less than said first reference value and said second reference value or more, and that the transmit power is decreased when said likelihood is less than said second reference value.

In order to solve the first problem, the invention is characterized in that the transmit power is increased when said likelihood is said first reference value or more, that a variation amount of the transmit power is made to be the power corresponding to said likelihood when said likelihood is less than said first reference value and said second reference value or more, and that the transmit power is decreased when said likelihood is less than said second reference value.

In order to solve the first problem, a mobile station according to the invention comprises: receiving means for receiving transmit power controlling information transmitted by a radio base station; measuring means for measuring the receiving quality of a wave transmitted by said radio base station; likelihood generating means for generating a likelihood of said transmit power controlling information on the basis of the transmit power controlling information received by said receiving means and the receiving quality measured by said measuring means; variation amount generating means for generating a variation amount of the transmit power on the basis of the likelihood generated by said likelihood generating means; and controlling means for controlling the transmit power of a mobile station on the basis of the variation amount generated by said variation amount generating means.

In order to solve the first problem, a mobile station according to the invention further comprises perch receiving quality measuring means for measuring the receiving quality of a perch signal transmitted by said radio base station, wherein said likelihood generating means generates a likelihood with the receiving quality measured by said perch receiving quality measuring means taken into a consideration.

In order to solve the first problem, in a communication system according to the invention, a radio base station comprises: transmit power controlling information generating means for generating transmit power controlling information for controlling the transmit power of a mobile station; and transmitting means for transmitting the transmit power controlling information generated by said transmit power controlling information generating means, and a mobile station comprises: receiving means for receiving the transmit power controlling information transmitted by said transmit means; measuring means for measuring the receiving quality of a wave transmitted by said radio base station; likelihood generating means for generating a likelihood of said transmit power controlling information on the basis of the transmit power controlling information received by said receiving means and the receiving quality measured by said measuring means; variation amount generating means for generating a variation amount of the transmit power on the basis of the likelihood generated by said likelihood generating means; and controlling means for controlling the transmit power of a mobile station on the basis of the variation amount generated by said variation amount generating means.

In order to solve the second problem, the invention is characterized in that a radio base station measures SIR for every said mobile station to compare each of said measured SIRs with a target SIR given in advance, generates a transmit power controlling signal for decreasing the transmit power when said SIR is the target SIR or more or when said radio base station has stopped a receiving operation for said mobile station, generates a transmit power controlling signal for increasing the transmit power when said SIR is less than the target SIR, and transmits said generated transmit power controlling signal to the mobile station.

In order to solve the second problem, the invention is characterized by a radio base station controlling transmit power of a mobile station comprising: signal quality measuring means for measuring signal quality of said mobile station; comparing means for comparing the signal quality measured by said signal quality measuring means with a predetermined value; generating means for generating, as a result of comparison in said comparing means, transmit power controlling information for decreasing said transmit power when said signal quality is said predetermined value or more and for generating transmit power controlling information for increasing said transmit power when said signal quality is less than said predetermined value; and transmitting means for transmitting to said mobile station the transmit power controlling signal generated by said generating means. The above signal quality is SIR or the like.

In order to solve the second problem, according to the invention, a radio base station controlling transmit power of a mobile station comprises: receiving means for receiving a channel transmitted by said mobile station; controlling means for controlling a receiving operation of said receiving means; generating means for generating instructing information for giving an instruction to decrease the transmit power of said mobile station at the time when said controlling means stops the receiving operation of said receiving means; and transmitting means for transmitting to said mobile station the instructing information generated by said generating means.

In order to solve the second problem, according to the invention, a radio base station controlling transmit power of a mobile station comprises: receiving means for receiving a channel transmitted by said mobile station; controlling means for controlling a receiving operation of said receiving means; generating means for generating instructing information for giving an instruction to decrease the transmit power of said mobile station when said controlling means tries to stop the receiving operation of said receiving means; and transmitting means for transmitting to said mobile station the instructing information generated by said generating means before said receiving operation is stopped.

BRIEF DESCRIPTION OF THE DRAWINGS

FIG. 6 shows an example of a change of transmit power of a mobile station according to the invention.

FIG. 7 shows a structure of a transmit power variation amount calculating portion according to the invention.

FIG. 8 illustrates an operation of a toggle portion according to the invention.

FIG. 26 shows a structure of an upstream channel transmit power controlling signal generating portion according to the invention.

FIG. 27 shows a structure of the transmit power controlling signal generating portion according to the invention.

FIG. 28 illustrates an operation of a selector 235$i$ according to the invention.

BEST MODE FOR CARRYING OUT THE INVENTION

Figure 35:
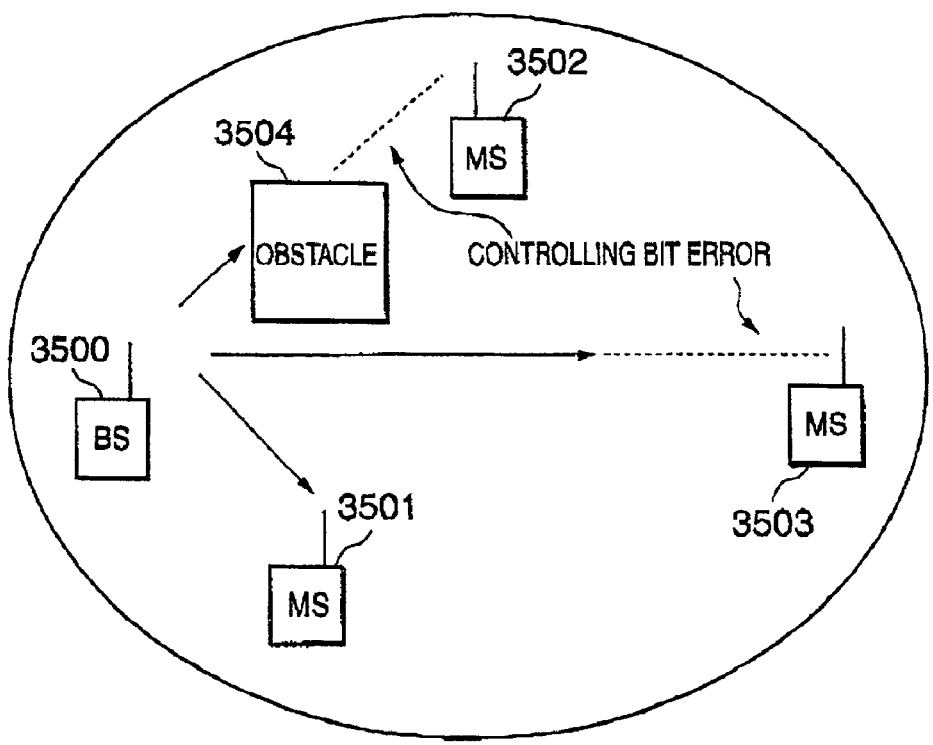
FIG. 35 shows a communication system to which the present invention is applied.

FIG. 35 shows a communication system according to the present invention. The communication system according to the invention includes a base station 3500 and mobile stations 3501 to 3503. The mobile station 3501 is located close to the base station 3500 with its line state stable, so that an error of power controlling bit would be few and power controlling would not be out of control. The mobile station 3502, however, has an obstacle 3504 such as a building on the way to the base station 3500, although it is located close to the base station. Therefore, the obstacle 3504 greatly attenuates the wave from the base station 3500, which may cause an error of the power controlling bit and the power control to be out of control. Further, the mobile station 3503 is located far away from the base station 3500, so that attenuation or interference of the wave may cause an error of the power controlling bit and the power control to be out of control. The invention provides a much more stable communication system, in which the power control itself would not be out of control even when a mobile station is in a condition that an error of the power controlling bit easily occurs.

Figure 1:
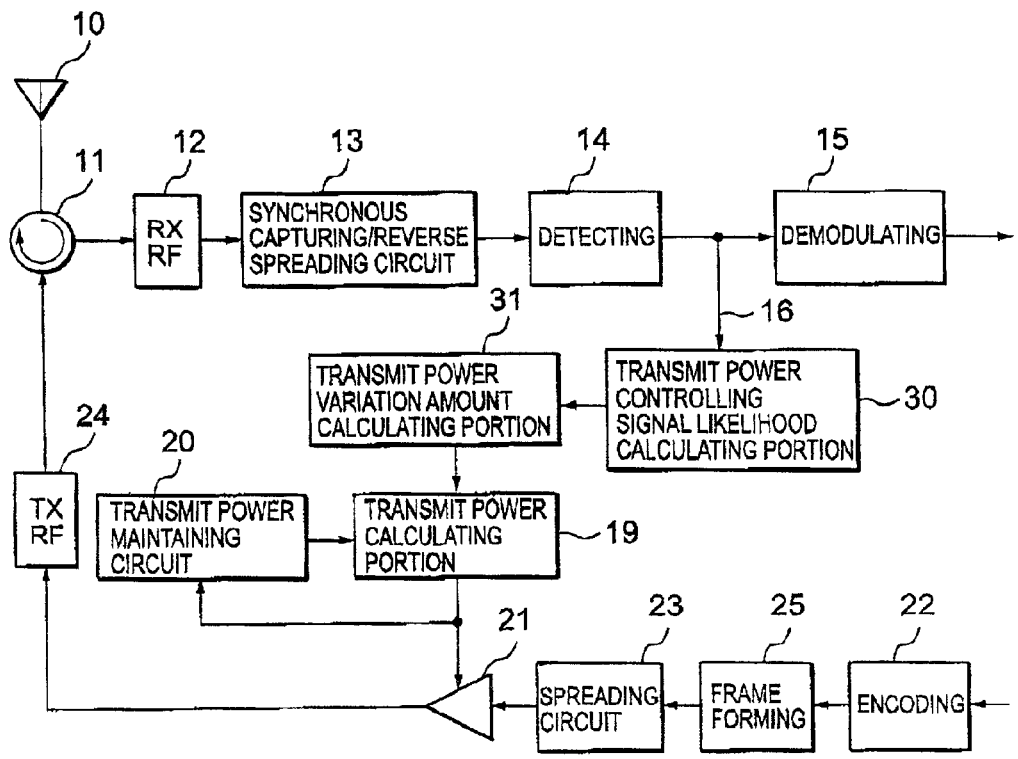
FIG. 1 shows a structure of a mobile station according to the invention.
Figure 32:
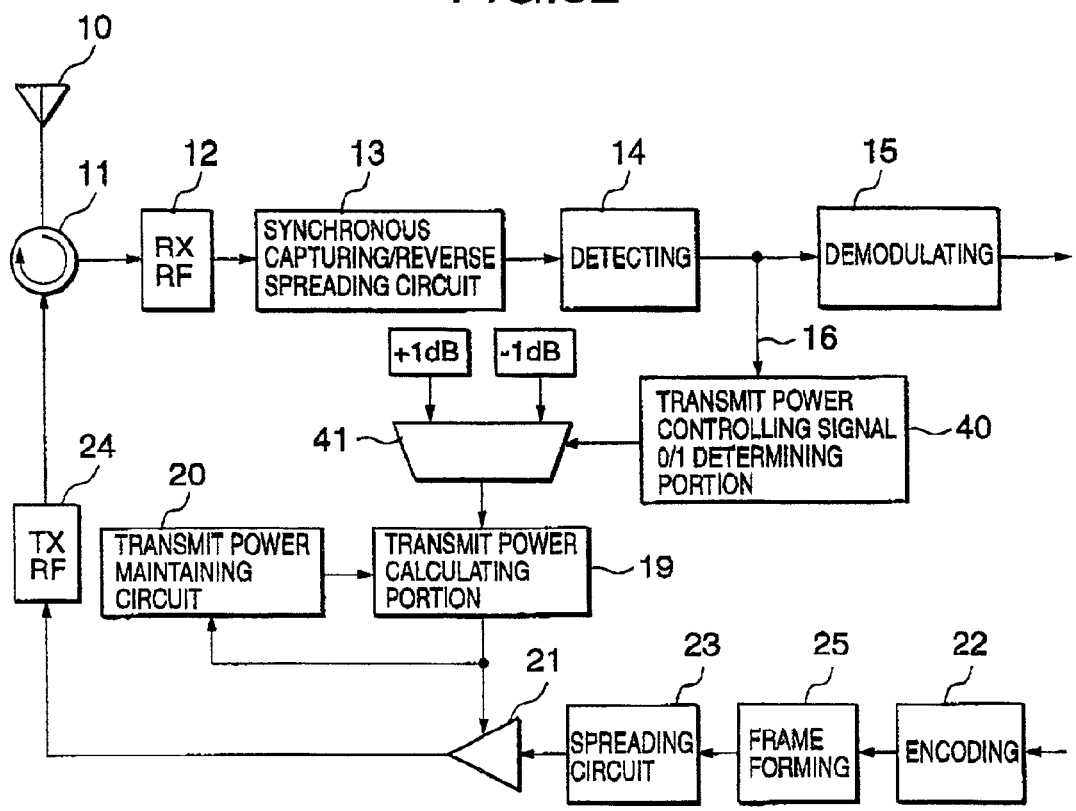
FIG. 32 shows a structure of a conventional mobile station.
Figure 33:
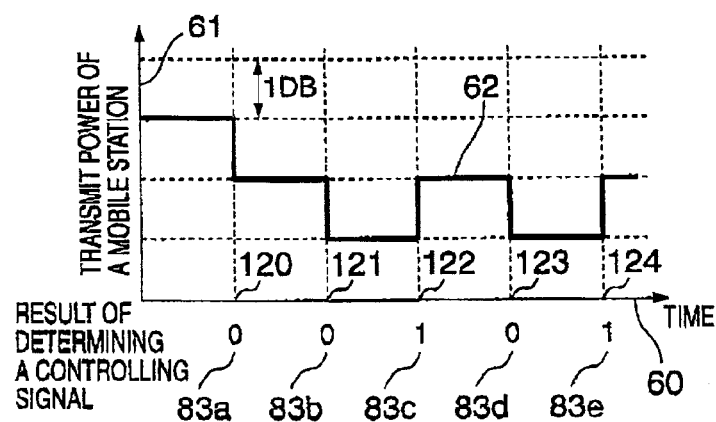
FIG. 33 shows a conventional varying state of transmit power.

FIG. 1 shows a structure of a mobile station of a first embodiment. Elements corresponding to those of a conventional mobile station shown in FIG. 32 are marked with the same reference number.

A received signal is processed in an antenna 10, a circulator 11, a radio module for receiving 12, a synchronous capturing/reverse spreading circuit 13 and a detecting portion 14, respectively, before being input to a transmit power controlling signal likelihood calculating portion 30 via a signal line 16.

Figure 2:
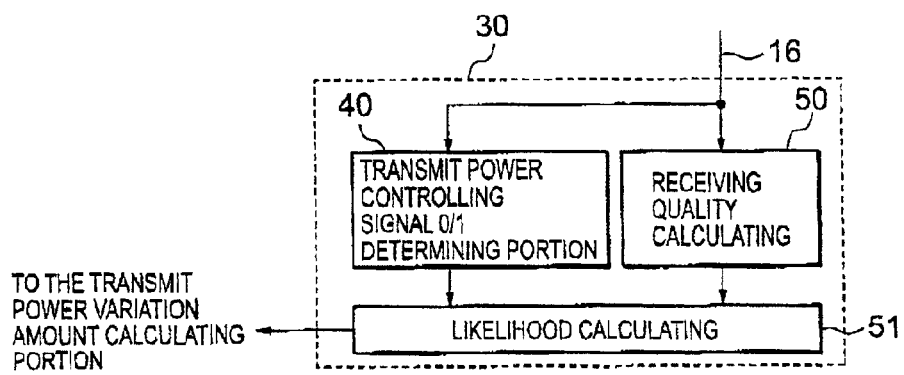
FIG. 2 shows a structure of a transmit power controlling signal likelihood calculating portion according to the invention.

The transmit power controlling signal likelihood calculating portion 30 calculates likelihood of a transmit power controlling signal on the basis of the receiving quality of the received transmit power controlling signal and a determined result of "0" or "1". A structure of the transmit power controlling signal likelihood calculating portion 30 is shown in FIG. 2. A transmit power controlling signal 0/1 determining portion 40 determines whether the received transmit power controlling signal is "0" or "1".

A receiving quality calculating portion 50 calculates the receiving quality of the received transmit power controlling signal to output it to a likelihood calculating portion 51. Basically, the receiving power, SIR, or the like, which is measured on the instant upon receiving the transmit power controlling signal, should be used as receiving quality calculated by the receiving quality calculating portion 50. On the other hand, a long time integral operation is required to accurately observe the receiving power or the SIR. In the case that the above-mentioned receiving power or the SIR integrated for a long time (referred to as a long time integral value, hereinafter) is used for transmit power controlling, which is required to be performed at high speed, it is considered that the controlling delay would be increased, so that the transmit power cannot properly controlled. Therefore, the receiving quality calculating portion 50 calculates the receiving quality of the transmit power controlling signal, using the above transmit power controlling signal and the result of integrating the receiving power or the SIR of a signal received at the time close to receiving the above transmit power controlling signal (referred to as a short time integral value, hereinafter).

Using the short time integral value may cause an incorrect calculation of the receiving quality when the short time integral value is used for calculating the receiving quality as it is, since an error of the short time integral value is considered to be large. Therefore, the receiving power calculating portion 50 may compare the long time integral value with the short time integral value, for example, so as to output the bad receiving quality when the difference of the both values is large.

Figure 34:
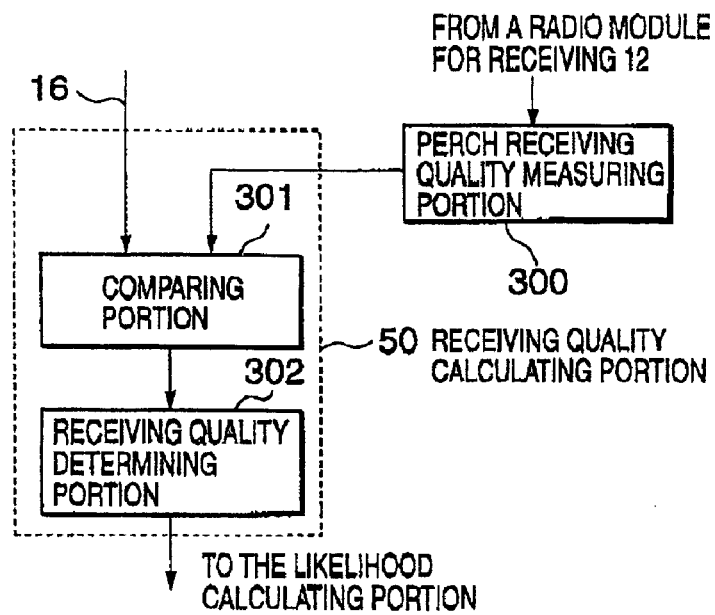
FIG. 34 shows a structure of a receiving quality calculating portion using perch receiving quality.

The receiving quality calculating portion 50 also may perform the following operation in order to estimate that a receiving condition of a channel being received is no longer proper due to cutting off a call or being in shade. A mobile station measures the receiving power or SIR of a channel, which is always transmitted from the base station like a perch channel in the W-CDMA mode, for example, and whose transmit power is known (referred to as perch receiving quality, hereinafter). A structure of the receiving quality calculating portion in this case is shown in FIG. 34. A perch receiving quality measuring portion 300 measures the above perch receiving quality. A comparing portion 301 compares the above-mentioned short time integral value and the perch receiving quality obtained by the perch receiving quality measuring portion 300. A receiving quality determining portion 302 determines, in accordance with a comparing result at the comparing portion 301, that a call has been cut off in the channel being received when only the receiving quality of the channel being received is deteriorated, and that the receiving condition is no longer proper due to such a situation that a mobile station is in shade when the both is deteriorated at the same time, and then, outputs a bad receiving quality.

Figure 3:
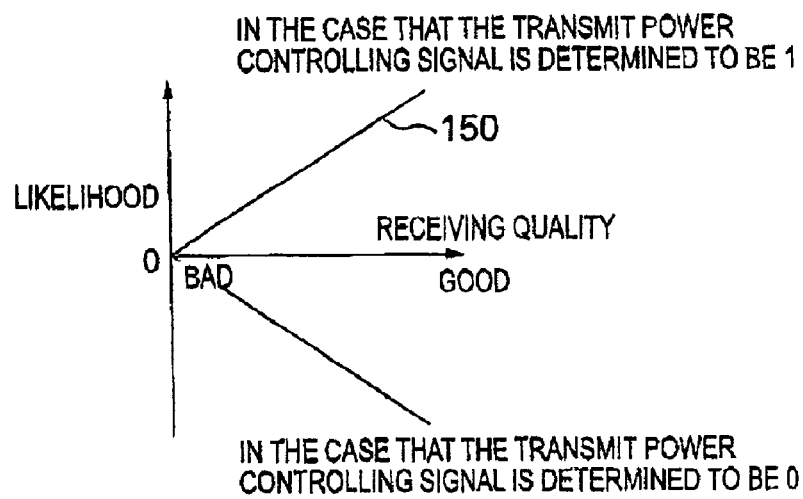
FIG. 3 shows a likelihood calculating method according to the invention.

The likelihood calculating portion 51 calculates the likelihood of the above transmit power controlling signal on the basis of the result of determining in the transmit power controlling signal 0/1 determining portion 40 and the result of calculating in the receiving quality calculating portion 50. An example of a relation between the likelihood and the results of determining in the transmit power controlling signal 0/1 determining portion 40 and of calculating in the receiving quality calculating portion 50 is shown by a bent line 150 in FIG. 3. The result of calculating the likelihood shown in FIG. 3 will be described below. It is defined that the likelihood is a positive value when the result of determining the transmit power controlling signal is 1. On the other hand, it is defined that the likelihood is a negative value when the result of determining is 0. Further, it is defined that an absolute value of the likelihood is large when the receiving quality is good, while the absolute value of the likelihood is small when the receiving quality is bad.

Figure 4:
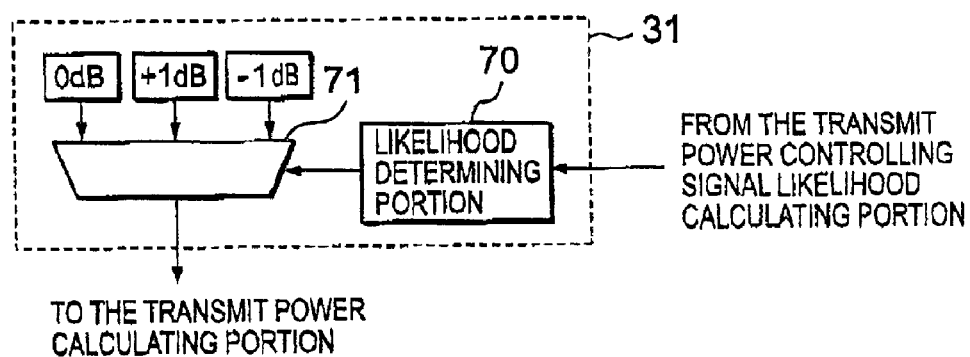
FIG. 4 shows a structure of a transmit power variation amount calculating portion according to the invention.
Figure 5:
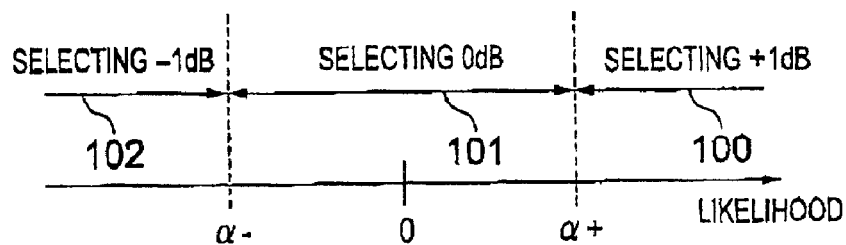
FIG. 5 shows an example of an operation of a likelihood determining portion according to the invention.

The likelihood of the transmit power controlling signal calculated in the above method is input to a transmit power variation amount calculating portion 31 in FIG. 1. The transmit power variation amount calculating portion 31 calculates the variation amount of the transmit power on the basis of the likelihood of the input transmit power controlling signal. A structure of the transmit power variation amount calculating portion 31 in the first embodiment is shown in FIG. 4. A likelihood determining portion 70 generates a controlling signal for selecting either "+1 dB (increase)", "−1 dB (decrease)" or "0 dB (no change)", for example, as the variation amount of the transmit power on the basis of the likelihood of the transmit power controlling signal input from the transmit power controlling signal likelihood calculating portion 30 to output the generated signal to a selector 71. An example of an operation of the likelihood determining portion 70 in the first embodiment is shown in FIG. 5. The likelihood determining portion 70 outputs to the selector 71 a controlling signal such that "+1 dB" is selected in the selector 71, when the likelihood of the transmit power controlling signal to be input exists within an area 100, which is α+ or more. Similarly, the likelihood determining portion 70 outputs to the selector 71 a controlling signal such that "0 dB" is selected, when the likelihood of the transmit power controlling signal to be input exists within an area 101, which is α− or more and less than α+, and the likelihood determining portion 70 outputs a controlling signal such that "−1 dB" is selected, when the likelihood of the transmit power controlling signal to be input exists within an area 102, which is less than α−. The selector 71 selects the transmit power variation amount in accordance with the controlling signal from the likelihood determining portion 70 to output the variation amount to the transmit power calculating portion 19 shown in FIG. 1.

The transmit power calculating portion 19 shown in FIG. 1 calculates the transmit power, as same as the case of the conventional mobile station, on the basis of the variation amount of the transmit power input from the transmit power variation amount calculating portion 31 and of the current transmit power input from the transmit power maintaining circuit 20. The transmission signal processed in the encoding portion 22 and the spreading circuit 23 is amplified so as to be transmitted at the aforementioned transmit power in the variable gain amplifier 21, and then, passes through the radio module for transmission 24 and the circulator 11 to be transmitted from the antenna 10.

An example of a change of transmit power of a mobile station in the case that the mobile station performs an operation in the first embodiment is shown as a solid line 63 in FIG. 6. As shown in FIG. 6, the mobile station operates so that the variation amount of the transmit power would be 0 dB, that is, the transmit power would not be changed, for a time 103 in which the likelihood of the transmit power controlling signal is α− or more and less than α+.

Next, an operation of a mobile station of the second embodiment will be described. A structure of the mobile station in the second embodiment is shown in FIG. 1 as same as that in the first embodiment. In the second embodiment, a structure of the transmit power variation amount calculating portion 31 is different from that of the first embodiment. The structure of the transmit power variation amount calculating portion 31 in the second embodiment is shown in FIG. 7. Elements corresponding to those of the transmit power variation amount calculating portion 31 in the first embodiment are marked with the same reference number.

The likelihood determining portion 70 generates a controlling signal for selecting either "+1 dB (increase)", "−1 dB (decrease)" or "toggle portion 72 (toggle operation)", for example, as a variation amount of the transmit power on the basis of the likelihood of the transmit power controlling signal input from the transmit power controlling signal likelihood calculating portion 30 to output the generated signal to the selector 71. An operation of the toggle portion 72 is shown in FIG. 8.

Figure 9:
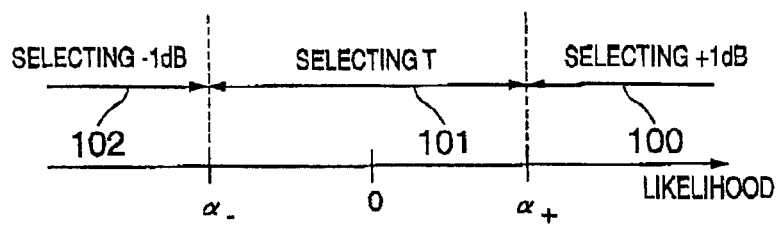
FIG. 9 illustrates an operation of a likelihood determining portion according to the invention.

The toggle portion 72 outputs "−1 dB" in the case of the input of "+1 dB", and "+1 dB" in the case of the input of "−1 dB". An example of an operation of the likelihood determining portion 70 in the second embodiment is shown in FIG. 9. The likelihood determining portion 70 outputs to the selector 71 a controlling signal such that "+1 dB" is selected in the selector 71, when the likelihood of the transmit power controlling signal to be input exists within an area 100, which is α+ or more. Similarly, the likelihood determining portion 70 outputs to the selector 71 a controlling signal such that "toggle portion 72" is selected, when the likelihood of the transmit power controlling signal to be input exists within an area 101, which is α− or more and less than α+, and the likelihood determining portion 70 outputs a controlling signal such that "−1 dB" is selected, when the likelihood of the transmit power controlling signal to be input exists within an area 102, which is less than α−.

The selector 71 selects the transmit power variation amount in accordance with the controlling signal from the likelihood determining portion 70 to output the variation amount to the transmit power calculating portion 19 shown in FIG. 1. The operation thereafter to the transmission of the transmission signal from the antenna 10 is same as that of the first embodiment.

Figure 10:
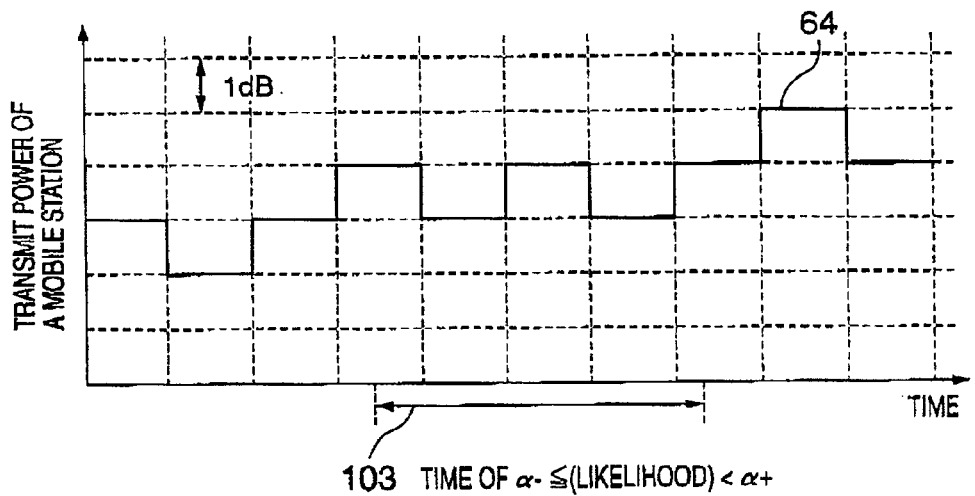
FIG. 10 shows an example of a change of transmit power of a mobile station according to the invention.

An example of a change of transmit power of a mobile station in the case that a mobile station performs an operation in the second embodiment is shown as a solid line 64 in FIG. 10. As shown in FIG. 10, the mobile station operates so that the variation amount of the transmit power would repeat "+1 dB" and "−1 dB" alternately, during a time 103 in which the likelihood of the transmit power controlling signal is α− or more and less than α+.

Figure 11:
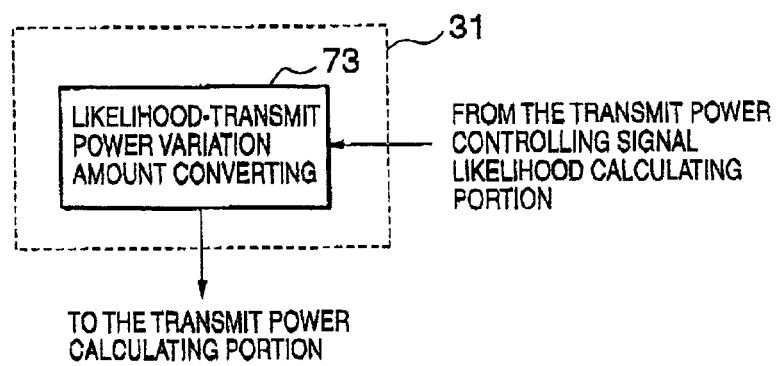
FIG. 11 shows a structure of a transmit power variation amount calculating portion according to the invention.
Figure 12:
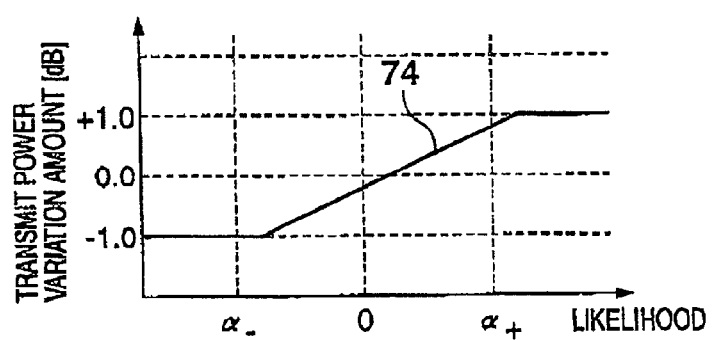
FIG. 12 illustrates an operation of a transmit power variation amount calculating portion according to the invention.

Next, an operation of a mobile station of the third embodiment will be described. A structure of the mobile station in the third embodiment is shown in FIG. 1 as same as the first and second embodiments. In the third embodiment, a structure of the transmit power variation amount calculating portion 31 is different from that of the first and second embodiments. The structure of the transmit power variation amount calculating portion 31 in the third embodiment is shown in FIG. 11. A likelihood-transmit power variation amount converting portion 73 converts the likelihood of the transmit power controlling signal input from the transmit power controlling signal likelihood calculating portion 30 into the transmit power variation amount. An example of an operation of the likelihood-transmit power variation amount converting portion 73 is shown as a line 74 in FIG. 12. In FIG. 12, the likelihood-transmit power variation amount converting portion 73 outputs "+1 dB", for example, to the transmit power calculating portion 19 as a transmit power variation amount, when the likelihood of the transmit power controlling signal to be input is α+ or more. Similarly, the likelihood-transmit power variation amount converting portion 73 outputs "−1 dB", for example, to the transmit power calculating portion 19 as a transmit power variation amount, when the likelihood of the transmit power controlling signal to be input is less than α−. The likelihood-transmit power variation amount converting portion 73 outputs a transmit power variation amount, which varies as shown as the line 74 in FIG. 12, for example, to the transmit power calculating portion 19 in accordance with the likelihood of the transmit power controlling signal. The operation thereafter to the transmission of the transmission signal from the antenna 10 is same as that of the first embodiment.

Figure 13:
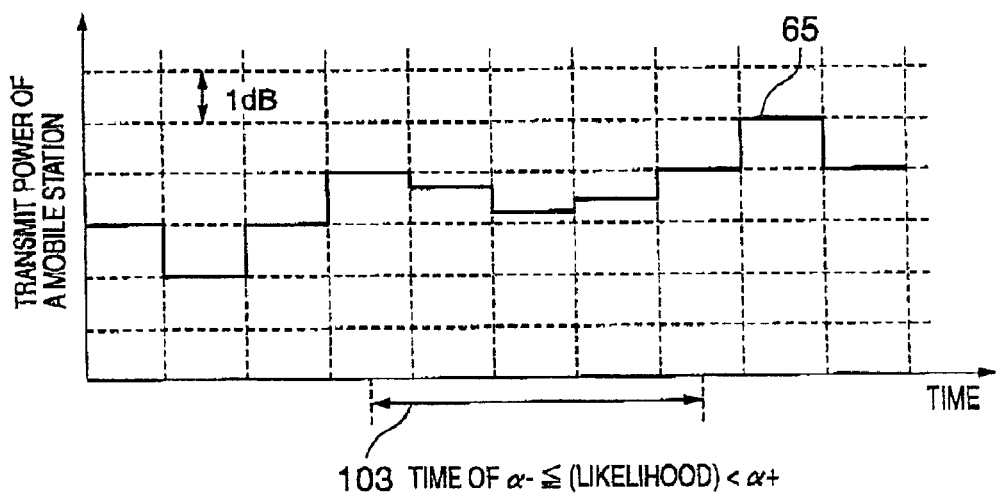
FIG. 13 shows an example of a change of transmit power of a mobile station according to the invention.

An example of a change of transmit power of a mobile station in the case that the mobile station performs an operation in the third embodiment is shown as a solid line 65 in FIG. 13. As shown in FIG. 13, the mobile station controls the transmit power so that the variation amount of the transmit power would be a value smaller than "+1 dB" and "−1 dB" during the time 103 in which the likelihood of the transmit power controlling signal is α− or more and less than α+.

Figure 14:
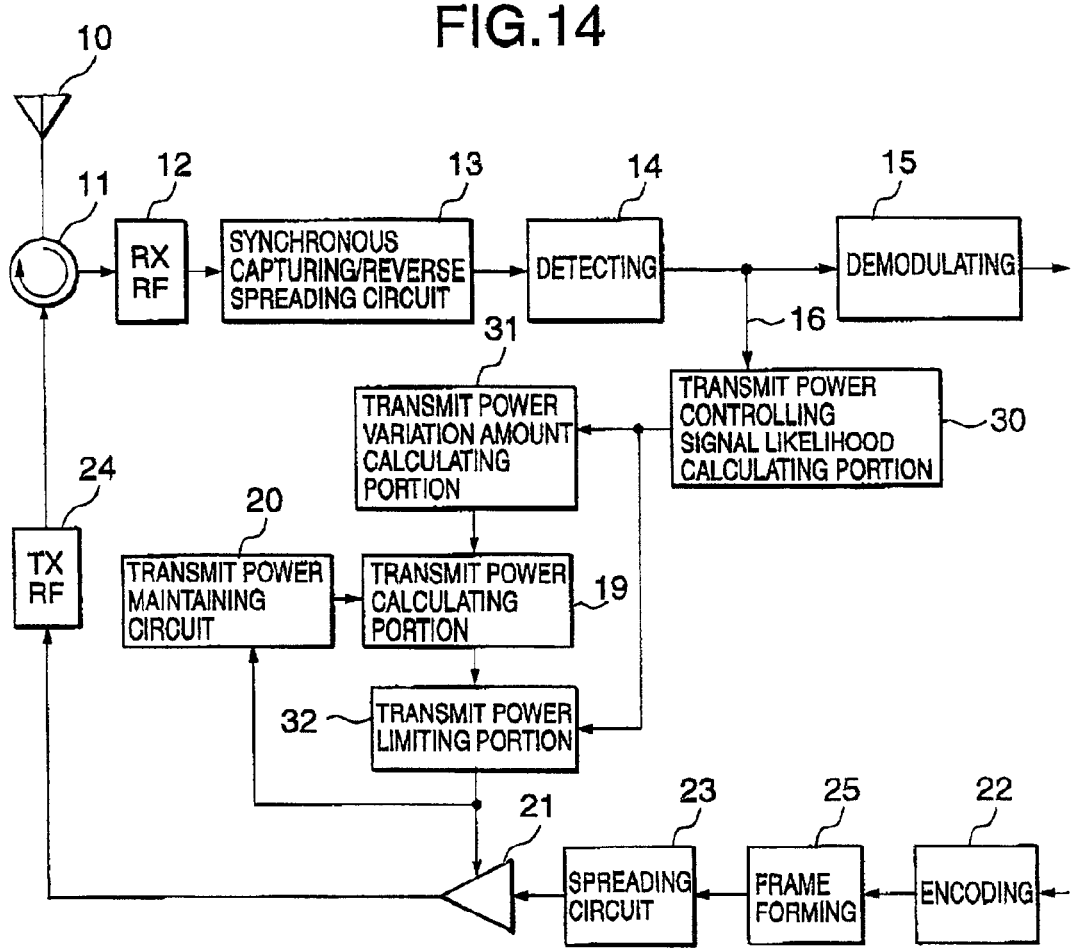
FIG. 14 shows a structure of a mobile station according to the invention.

A structure of the mobile station in the fourth embodiment is shown in FIG. 14. Elements corresponding to a structure of the mobile stations shown in FIGS. 32 and 1 are marked with the same reference number. The likelihood of the transmit power controlling signal calculated in the transmit power controlling signal likelihood calculating portion 30 is input to the transmit power variation amount calculating portion 31, as same as in the first embodiment.

Figure 15:
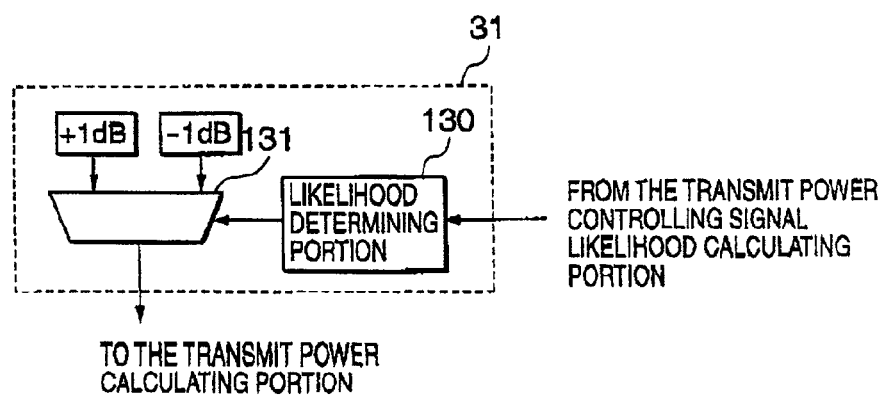
FIG. 15 shows a structure of a transmit power variation amount calculating portion according to the invention.
Figure 16:
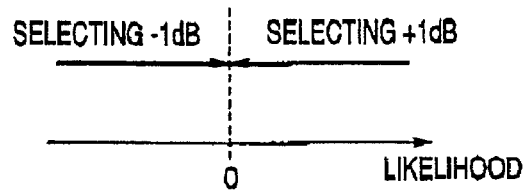
FIG. 16 illustrates an operation of a likelihood determining portion according to the invention.

A structure of the transmit power variation amount calculating portion 31 in the fourth embodiment is shown in FIG. 15. The likelihood determining portion 130 generates a controlling signal for selecting either "+1 dB (increase)" or "−1 dB (decrease)", for example, as a variation amount of the transmit power on the basis of the likelihood of the transmit power controlling signal input from the transmit power controlling signal likelihood calculating portion 30 to output the generated signal to a selector 131. An example of an operation of the likelihood determining portion 130 in the fourth embodiment is shown in FIG. 16. The likelihood determining portion 130 outputs to the selector 131 a controlling signal such that "+1 dB" is selected in the selector 131, when the likelihood of the transmit power controlling signal to be input exists within an area of 0 or more. On the other hand, the likelihood determining portion 130 outputs to the selector 131 a controlling signal such that "−1 dB" is selected, when the likelihood of the transmit power controlling signal to be input exists within an area less than 0. The selector 131 selects the transmit power variation amount in accordance with the controlling signal from the likelihood determining portion 130 to output the variation amount to the transmit power calculating portion 19 shown in FIG. 14. The transmit power calculating portion 19 calculates the transmit power of the mobile station as same as in the first embodiment.

Figure 17:
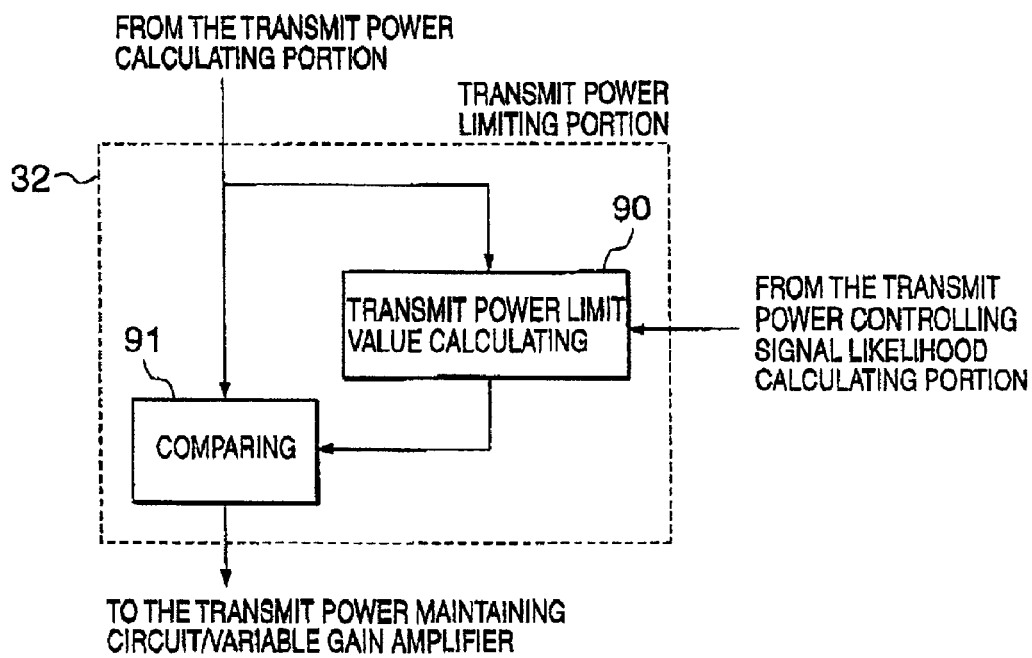
FIG. 17 shows a structure of a transmit power controlling portion according to the invention.
Figure 18:
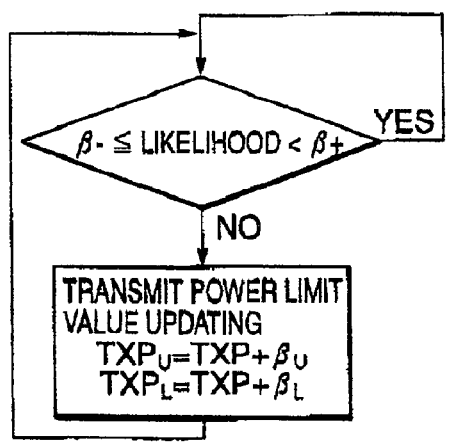
FIG. 18 shows a structure of a transmit power limit value calculating portion according to the invention.

The transmit power limiting portion 32 compares the transmit power calculated in the transmit power calculating portion 19 and the transmit power limit value calculated inside the transmit power limiting portion 32 to control the transmit power of the mobile station. A structure of the transmit power limiting portion 32 is shown in FIG. 17. The transmit power input from the transmit power calculating portion 19 is input to a transmit power limit value calculating portion 90 and a comparing portion 91. An example of an operation of the transmit power limit value calculating portion 90 is shown in FIG. 18. In the transmit power limit value calculating portion 90, the likelihood of the transmit power controlling signal input from the transmit power controlling signal likelihood calculating portion 30 is first compared with thresholds β− and β+. When the likelihood of the transmit power controlling signal cannot establish a relation β−≦(likelihood)<β+, that is, when the absolute value of the likelihood of the transmit power controlling signal is large, the upper limit value TXPU of the transmit power and the lower limit value TXPL of the transmit power are updated. According to this operation, the upper and lower limit values of the transmit power of the mobile station are calculated when the absolute value of the likelihood of the transmit power controlling signal is large, that is, when the receiving quality of the transmit power controlling signal is good, while the upper and lower limit values of the transmit power of the mobile station are maintained when the absolute value of the likelihood of the transmit power controlling signal is small, that is, when the receiving quality of the transmit power controlling signal is bad.

The comparing portion 91 shown in FIG. 17 compares the transmit power input from the transmit power calculating portion 19 and the upper and lower limit values of the transmit power input from the transmit power limit value calculating portion 90. The comparing portion 91 changes the transmit power into TXPU to output it to the transmit power maintaining circuit 20 and the variable gain amplifier 21 shown in FIG. 14, when the transmit power input from the transmit power calculating portion 19 is larger than the upper limit value TXPU of the transmit power input from the transmit power limit value calculating portion 90. On the other hand, the comparing portion 91 changes the transmit power into TXPL to output it to the transmit power maintaining circuit 20 and the variable gain amplifier 21 shown in FIG. 14, when the transmit power input from the transmit power calculating portion 19 is smaller than the lower limit value TXPL of the transmit power input from the transmit power limit value calculating portion 90. Further, the comparing portion 91 outputs the transmit power input from the transmit power calculating portion 19 to the transmit power maintaining. circuit 20 and the variable gain amplifier 21 shown in FIG. 14, as it is, when the transmit power input from the transmit power calculating portion 19 is between TXPU and TXPL. The operation thereafter to the transmission of the transmission signal from the antenna 10 is same as that of the first embodiment.

Figure 19:
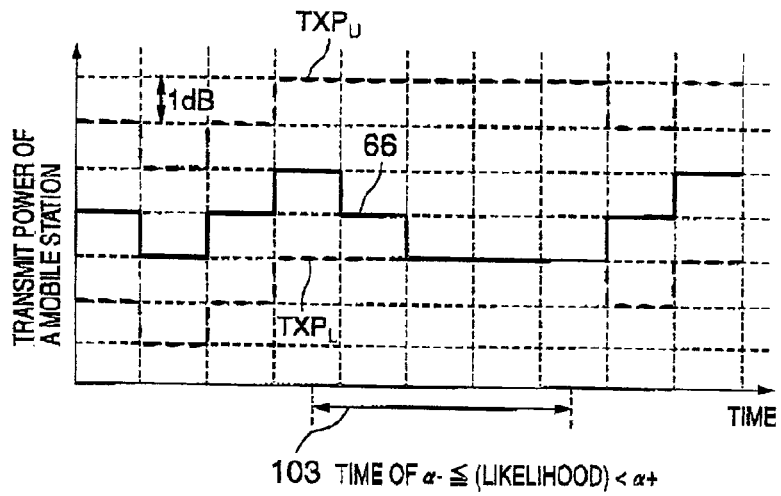
FIG. 19 shows an example of a change of transmit power according to the invention.

An example of a change of transmit power of a mobile station in the case that the mobile station performs an operation in the fourth embodiment is shown as a solid line 66 in FIG. 19. As shown in FIG. 19, the upper limit value TXPU and the lower limit value TXPL of the transmit power of the mobile station are maintained at a certain value during the time 103 in which the likelihood of the transmit power controlling signal is α− or more and less than α+. In the example shown in FIG. 19, the transmit power of the mobile station is limited not so as to be less than the lower value TXPL of the transmit power during the time 103.

In the fourth embodiment, the transmit power variation amount calculating portion 31 may have a structure shown in the first to third embodiments.

Figure 20:
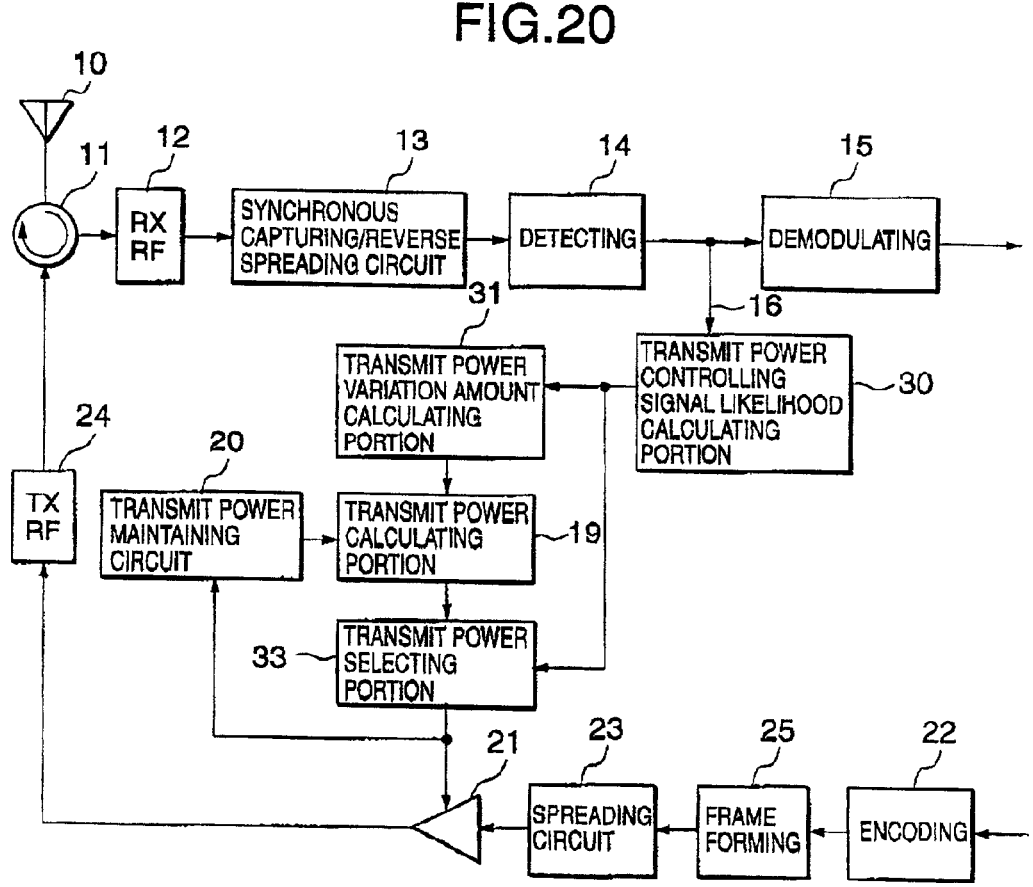
FIG. 20 shows a structure of a mobile station according to the invention.

A structure of a mobile station in the fifth embodiment is shown in FIG. 20. Elements corresponding to a structure of the mobile stations shown in FIGS. 32 and 1 are marked with the same reference number. The likelihood of the transmit power controlling signal calculated in the transmit power controlling signal likelihood calculating portion 30 is input to the transmit power variation amount calculating portion 31, as same as in the first embodiment. The transmit power variation amount calculating portion 31 may have any structure and operation of the transmit power variation amount calculating portion 31 described in the first to fourth embodiments. The variation amount of the transmit power calculated in the transmit power variation amount calculating portion 31 is input to the transmit power calculating portion 19.

The transmit power calculating portion 19 calculates the transmit power of the mobile station as same as in the first embodiment.

The transmit power calculated in the transmit power calculating portion 19 is input to a transmit power selecting portion 33. The transmit power selecting portion 33 selects the transmit power in accordance with the likelihood of the transmit power controlling signal input from the transmit power controlling signal likelihood calculating portion 30.

Figure 21:
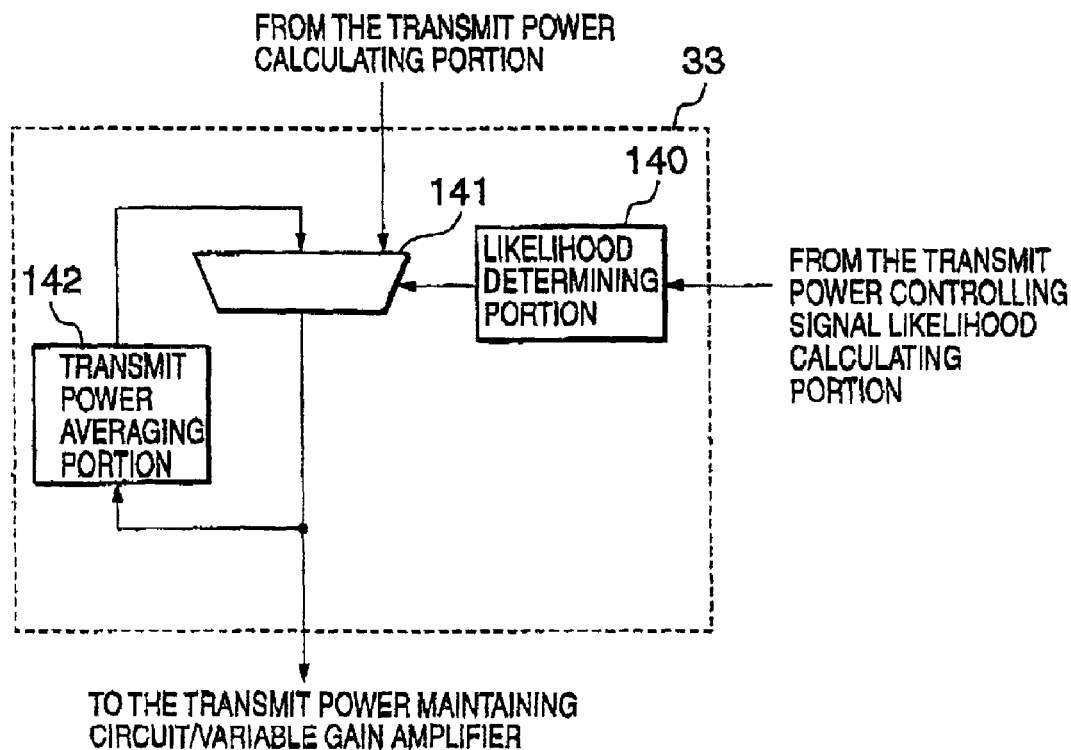
FIG. 21 shows a structure of a transmit power selecting portion according to the invention.
Figure 22:
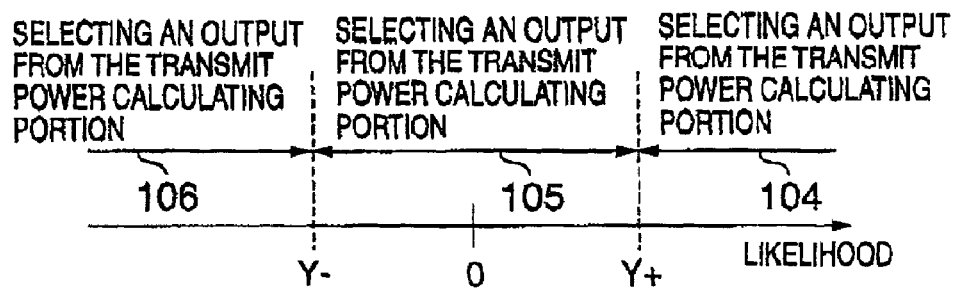
FIG. 22 illustrates an operation of a likelihood determining portion according to the invention.

A structure of the transmit power selecting portion 33 in the fifth embodiment is shown in FIG. 21. A likelihood determining portion 140 generates a controlling signal for selecting as the transmit power either the transmit power input from the transmit power calculating portion 19 or the transmit power input from a transmit power averaging portion. 142 on the basis of the likelihood of the transmit power controlling signal input from the transmit power controlling signal likelihood calculating portion 30, and outputs the generated signal to a selector 141. An example of an operation of the likelihood determining portion 140 in the fifth embodiment is shown in FIG. 22. The likelihood determining portion 140 outputs to the selector 141 a controlling signal such that the transmit power input from the transmit power calculating portion 19 is selected in the selector 141, when the likelihood of the transmit power controlling signal to be input exists within an area 104, which is γ+ or more, or an area 106, which is less than γ−, namely, when the receiving quality of the received transmit power controlling signal is good. On the other hand, the likelihood determining portion 140 outputs to the selector 141 a controlling signal such that the transmit power input from the transmit power averaging portion 142 is selected, when the likelihood of the transmit power controlling signal to be input exists within an area 105, which is γ− or more and less than γ+, namely, when the receiving quality of the received transmit power controlling signal is bad. The selector 141 selects the transmit power in accordance with the controlling signal from the likelihood determining portion 140 to output the transmit power to a transmit power maintaining circuit 20 and a variable gain amplifier 21 shown in FIG. 20. The transmit power averaging portion 142 calculates an average value of the transmit power to be input so as to output the average value to the selector 141.

The operation thereafter to the transmission of the transmission signal from the antenna 10 is same as that of the first embodiment.

Figure 23:
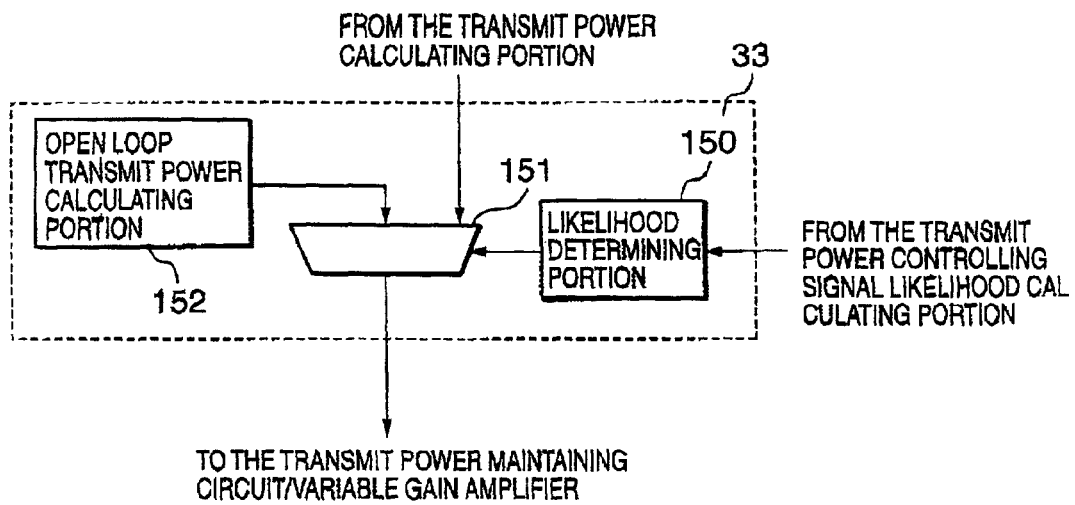
FIG. 23 shows a structure of a transmit power selecting portion according to the invention.
Figure 24:
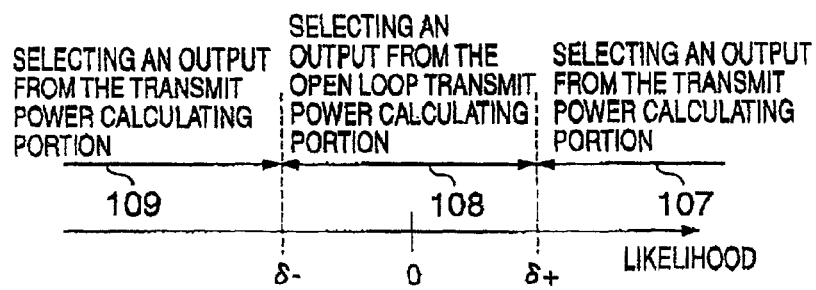
FIG. 24 shows a structure of a likelihood selecting portion according to the invention.

Next, an operation of a mobile station of the sixth embodiment will be described. A structure of the mobile station in the sixth embodiment is shown in FIG. 20 as same as that in the fifth embodiment. In the sixth embodiment, a structure of the transmit power selecting portion 33 is different from that of the fifth embodiment. The structure of the transmit power selecting portion 33 in the sixth embodiment is shown in FIG. 23. A likelihood determining portion 150 generates a controlling signal for selecting as the transmit power either the transmit power input from the transmit power calculating portion 19 or the transmit power input from an open loop transmit power calculating portion 152 on the basis of the likelihood of the transmit power controlling signal input from the transmit power controlling signal likelihood calculating portion 30, and outputs the generated signal to a selector 151. An example of an operation of the likelihood determining portion 150 in the sixth embodiment is shown in FIG. 24. The likelihood determining portion 150 outputs to the selector 151 a controlling signal such that the transmit power input from the transmit power calculating portion 19 is selected in the selector 151, when the likelihood of the transmit power controlling signal to be input exists within an area 107, which is δ+ or more, or an area 109, which is less than δ−, namely, when the receiving quality of the received transmit power controlling signal is good.

On the other hand, the likelihood determining portion 150 outputs to the selector 151 a controlling signal such that the transmit power input from the open loop transmit power calculating portion 152 is selected, when the likelihood of the transmit power controlling signal to be input exists within an area 108, which is δ− or more and less than δ+, namely, when the receiving quality of the received transmit power controlling signal is bad. The selector 151 selects the transmit power in accordance with the controlling signal from the likelihood determining portion 150 to output the transmit power to the transmit power maintaining circuit 20 and the variable gain amplifier 21 shown in FIG. 20.

The open loop transmit power calculating portion 152 uses the receiving quality, the receiving power and the like of a channel different from the channel being used for a communication such as a perch channel in the W-CDMA mode, for example, so as to estimate the attenuation amount between a mobile station and a base station, and calculates the transmit power of the mobile station, which meets the receiving quality required in the base station. The open loop transmit power calculating portion 152 outputs the calculated transmit power to the selector 151.

The operation thereafter to the transmission of the transmission signal from the antenna 10 is same as that of the first embodiment.

Figure 25:
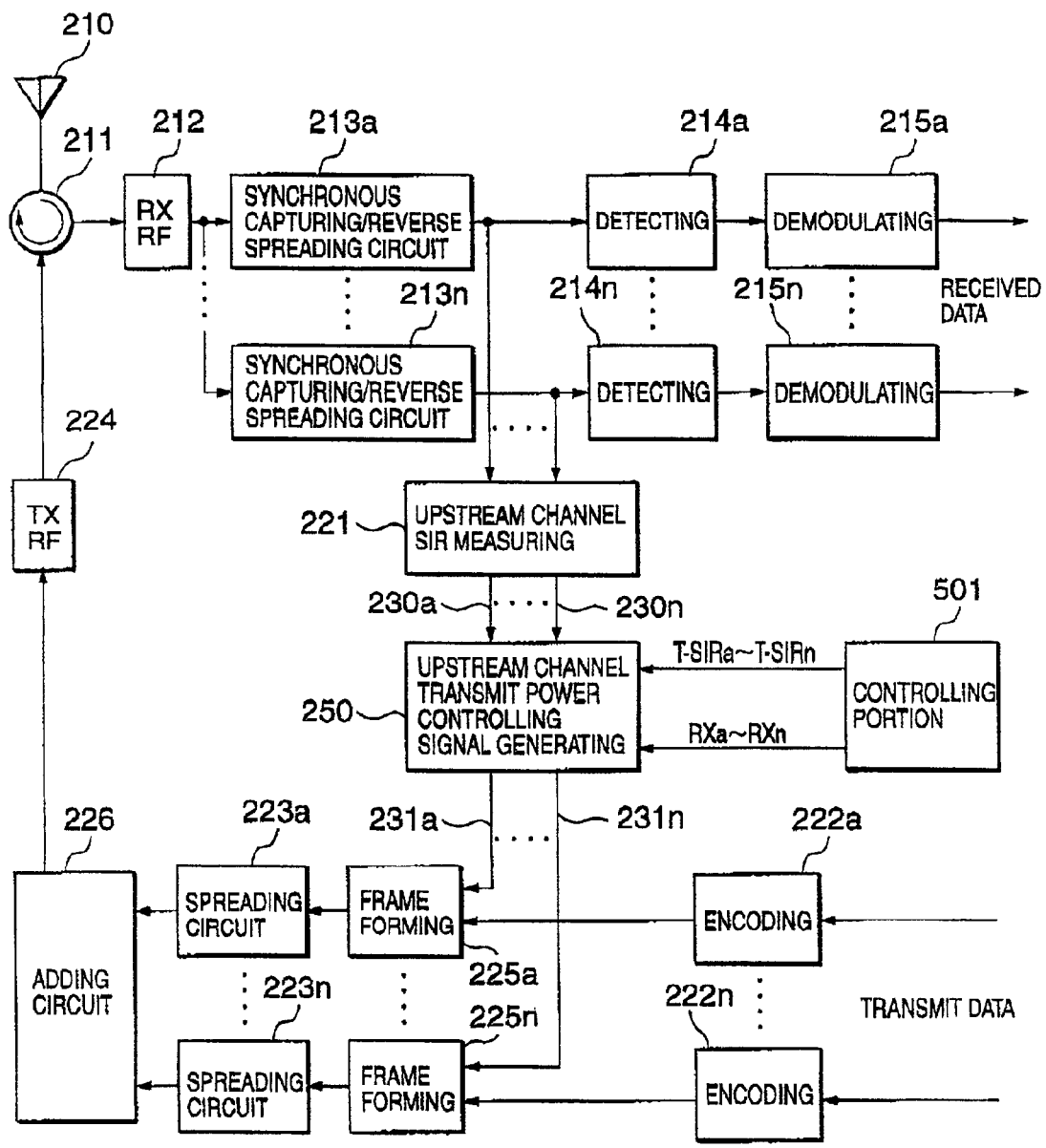
FIG. 25 shows a structure of a base station according to the invention.
Figure 29:
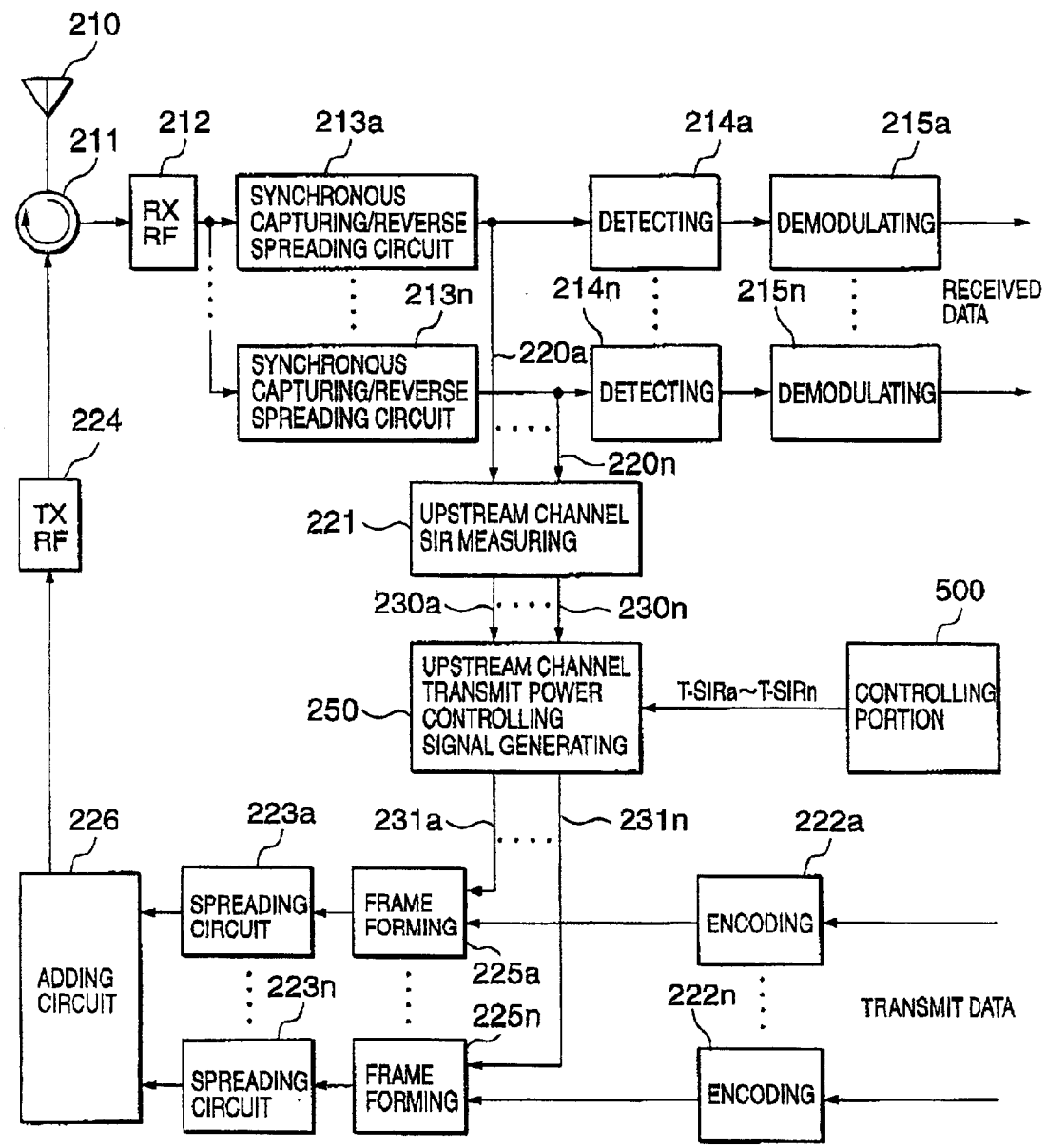
FIG. 29 shows a structure of a conventional base station.
Figure 30:
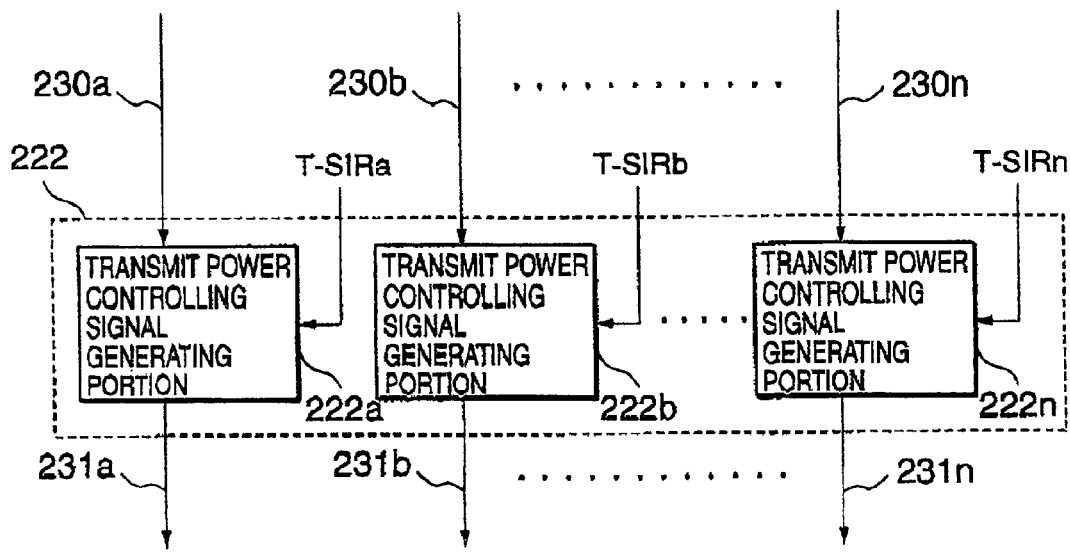
FIG. 30 shows a structure of an upstream channel transmit power controlling signal generating portion according to the invention.
Figure 31:
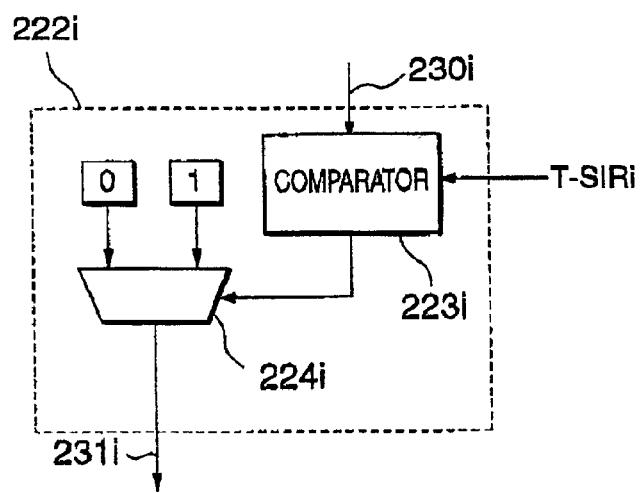
FIG. 31 shows a structure of a conventional transmit power controlling signal generating portion.

A structure of a base station in the seventh embodiment is shown in FIG. 25. Elements corresponding to a structure of a conventional base station shown in FIG. 29 are marked with the same reference number. A received signal is measured for SIR (SIRa to SIRn) per a mobile station (MSa to MSn) in the upstream channel SIR measuring portion 221 to be input through signal lines 230a to 230n into an upstream channel transmit power controlling signal generating portion 250 as same as in the conventional base station.

The upstream channel transmit power controlling signal generating portion 250 generates a transmit power controlling signal for MSa to MSn (referred to as TPCa to TPCn) on the basis of a comparison result between SIRa to SIRn and a target SIR, which is given in advance from a controlling portion 501 for MSa to MSn (referred to as T-SIRa to T-SIRn), and of RXa to RXn, which are a controlling signal showing whether a receiving operation is performed for a signal transmitted from the MSa to MSn and which are input from the controlling portion 501. The controlling portion 501 is further provided with a function for supplying the upstream channel transmit power controlling signal generating portion 250 with RXa to RXn, in addition to a function same as the controlling portion 500 of the conventional base station shown in FIG. 29. When a normal communication is carried out between MSi (i=a, . . . , n) and the base station, RXi (i=a, . . . , n) is a signal whose content indicates that a receiving operation is going on for the signal transmitted from MSi. On the other hand, when a normal communication cannot be maintained between MSi and the base station due to an influence of such as being in shade, so that the base station stops receiving a signal from MSi, RXi is a signal whose content indicates that the receiving operation is not performed for the signal transmitted from MSi.

A structure of the upstream channel transmit power controlling signal generating portion 250 is shown in FIG. 26. The upstream channel transmit power controlling signal generating portion 250 comprises transmit power controlling signal generating portions 250a to 250n whose inputs are SIRi, T-SIRi and RXi and whose outputs are TPCi. The added character "i" denotes one of characters "a" to "n". A structure of a transmit power controlling signal generating portion 250i is shown in FIG. 27. A comparator 254i compares SIRi input through a signal line 230i and T-SIRi to generate a signal that selects 0 (a signal instructing to decrease the transmit power) in a selector 251i in the case of SIRi≧T-SIRi, and a signal that selects 1 (a signal instructing to increase the transmit power) in the selector 251i in the case of SIRi<T-SIRi. The selector 251i selects 0 or 1 in accordance with an output from the comparator 254i to output it through a signal line 252i to a selector 253i. The selector 253i determines the transmit power controlling signal TPCi in accordance with the signal RXi indicating whether a receiving operation is going on or not. An operation of the selector 253i is shown in FIG. 28. The selector 253i selects a signal input as the transmit power controlling signal TPCi through a signal line 252i, when RXi is a signal indicating that a receiving operation is going on. On the contrary, the selector 253i selects 0 (a signal instructing to decrease the transmit power) as the transmit power controlling signal TPCi when RXi is a signal indicating that a receiving operation has been stopped.

The transmit power controlling signals TPCa to TPCn for MSa to MSn generated in the above method are input through signal lines 231a to 231n into frame forming portions 225a to 225n to take processes similar to the case of the conventional base station before being transmitted from the antenna 210.

A mobile station according to the invention does not cause an error in controlling the transmit power even in the case of receiving the transmit power controlling signal, which includes an error in receiving. That is, transmission at excessive transmit power due to incorrect control or out-of control can be prevented, so that the number of subscribers contained in a system can be increased, compared with the conventional case. Further, the power supply of a mobile station can be saved since the transmission is not carried out at excessive transmit power.

According to the radio base station according to the invention, it can be possible to prevent a mobile station from transmitting at excessive transmit power by controlling the mobile station not to transmit an improper transmit power controlling signal after stopping a receiving operation for the signal to be transmitted. Thus, deterioration of the communication quality due to an error in controlling power can be avoided and the subscriber capacity of a whole system can be significantly improved.

What is claimed is:

1. A transmit power controlling method in a code division multiple access communication system which includes a radio base station and a mobile station, said method comprising the steps of:

transmitting, by said radio base station, a transmit power controlling signal for controlling transmit power of said mobile station; and generating, by said mobile station, a reference value for calculating a control amount of transmit power of said mobile station based on the transmit power controlling signal received from said radio base station and the receiving quality of the transmit power controlling signal, and generating a variation amount of the transmit power based on said reference value, so that the transmit power of said mobile station is controlled based on the variation amount.

2. The transmit power controlling method in a code division multiple access communication system according to claim 1, wherein said reference value is generated with a perch channel receiving quality of a signal transmitted from said radio base station also taken into account.

3. The transmit power controlling method in a code division multiple access communication system according to claim 1, wherein the receiving quality of a perch channel signal transmitted from said radio base station is compared with the receiving quality of the transmit power controlling signal so that it is determined that a call is cut off when only one of the receiving qualities is deteriorated and it is determined that a receiving condition is no longer proper when the both of the receiving qualities are deteriorated, and in that the reference value is generated based on a result of the determination.

4. The transmit power controlling method in a code division multiple access communication system according to claim 1, wherein, when an absolute value of the reference value of said transmit power controlling signal is larger than a predetermined value, an upper limit value and a lower limit value of the transmit power of a mobile station are updated and maintained so that the transmit power of said mobile station is limited between said upper limit value and said lower limit value.

5. The transmit power controlling method in a code division multiple access communication system according to claim 1, wherein an average value of the transmit power of a mobile station is generated, and that the transmit power of said mobile station is switched based on the size of said reference value so as to be either said generated average transmit power of the mobile station or transmit power of the mobile station that is generated based on said reference value.

6. The transmit power controlling method in a code division multiple access communication system according to claim 1, wherein an open loop transmit power signal is generated based on the receiving quality or the receiving power of another channel different from a channel being used, and that the transmit power of said mobile station is switched based on the size of said reference value so as to be a transmit power based on the generated open loop transmit power controlling signal or transmit power based on the generated reference value.

7. The transmit power controlling method in a code division multiple access communication system according to claim 1, wherein said transmit power controlling signal is a signal comprising two values, and that said reference value is calculated so that an absolute value of the reference value would be larger than a predetermined value when the receiving quality is better than a predetermined quality and so that an absolute value of the reference value would be smaller than a predetermined value when the receiving quality is worse than a predetermined quality.

8. The transmit power controlling method in a code division multiple access communication system according to claim 7, wherein the transmit power is increased when said reference value is greater than or equal to a first reference value, wherein the transmit power is maintained when said reference value is greater than or equal to a second reference value, and wherein the transmit power is decreased when said reference value is less than said second reference value.

9. The transmit power controlling method in a code division multiple access communication system according to claim 7, wherein the transmit power is increased when said reference value is greater than or equal to said first reference value, wherein the transmit power is toggle-controlled when said reference value is greater than or equal to said second reference value, and wherein the transmit power is decreased when said reference value is less than said second reference value.

10. The transmit power controlling method in a code division multiple access communication system according to claim 7, wherein the transmit power is increased when said reference value is greater than or equal to said first reference value, that a variation amount of the transmit power is made to be the power corresponding to said reference value when said reference value is greater than or equal to said second reference value, and wherein the transmit power is decreased when said reference value is less than said second reference value.

11. A mobile station characterized by comprising:

receiving means for receiving transmit power controlling information transmitted by a radio base station;

measuring means for measuring the receiving quality of a wave transmitted by said radio base station;

reference value generating means for generating a reference value for calculating a control amount of transmit power for said mobile station based on the transmit power controlling information received by said receiving means from said radio base station and the receiving quality measured by said measuring means;

variation amount generating means for generating a variation amount of the transmit power based on the reference value generated by said reference value generating means; and controlling means for controlling the transmit power of a mobile station based on the variation amount generated by said variation amount generating means.

12. The mobile radio station according to claim 11, further comprising:

perch channel receiving quality measuring means for measuring the receiving quality of a perch channel signal transmitted by said radio base station, wherein said reference value generating means generates a reference value with the receiving quality measured by said perch channel signal receiving quality measuring means taken into a consideration.

13. A code division multiple access communication system comprising:

a radio base station; and a mobile station, wherein said radio base station comprises:

transmit power controlling information generating means for generating transmit power controlling information for controlling the transmit power of a mobile station, and transmitting means for transmitting the transmit power controlling information generated by said transmit power controlling information generating means, and wherein said mobile station comprises:

receiving means for receiving the transmit power controlling information transmitted by said transmitting means, measuring means for measuring the receiving quality of a wave transmitted by said radio base station, reference value generating means for generating a reference value for calculating a control amount of transmit power for said mobile station based on the transmit power controlling information received by said receiving means and the receiving quality measured by said measuring means, variation amount generating means for generating a variation amount of the transmit power based on the reference value generated by said reference value generating means, controlling means for controlling the transmit power of a mobile station based on the variation amount generated by said variation amount generating means.

\* \* \* \* \*